Nov. 17, 1936.  W. KRUMBHAAR  2,061,469
PROCESS FOR MELTING AND TREATING ORGANIC SUBSTANCES EMPLOYED
IN THE MANUFACTURE OF VARNISHES AND THE LIKE
Filed May 5, 1934
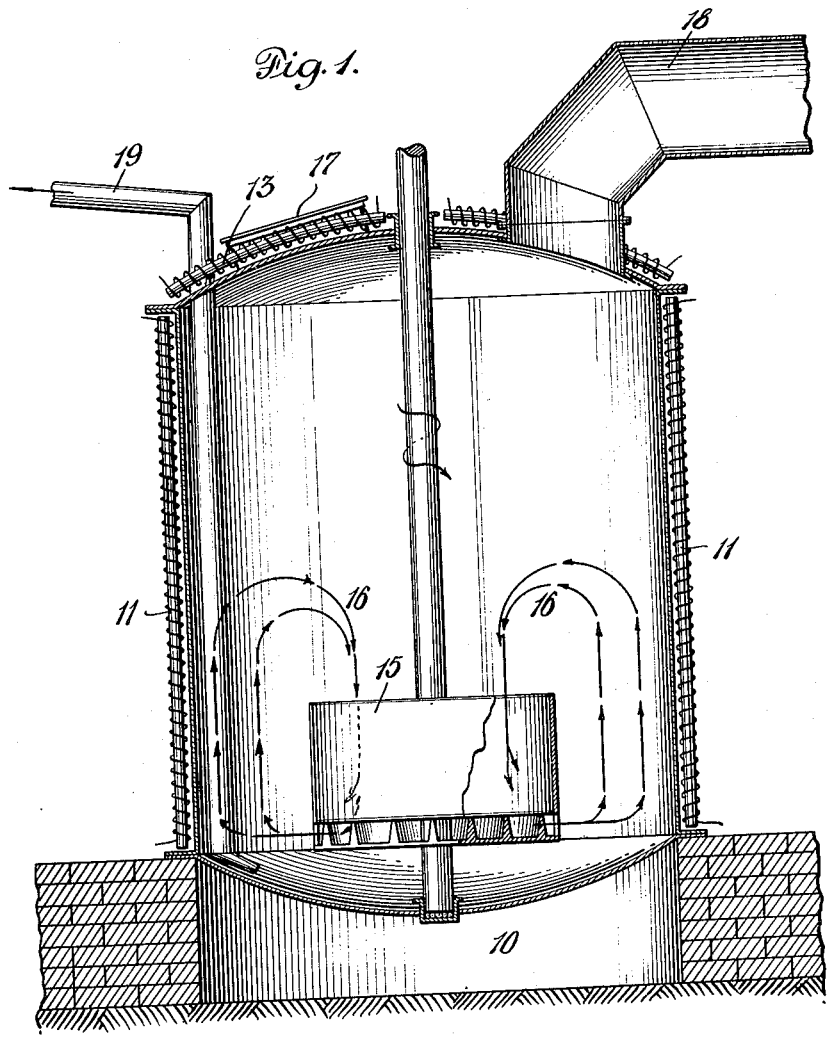
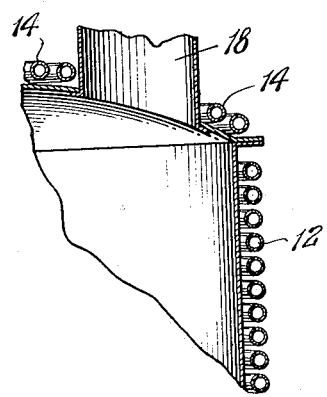
INVENTOR
Wilhelm Krumbhaar
BY
ATTORNEY Patented Nov. 17, 1936

2,061,469

UNITED STATES PATENT OFFICE 2,061,469

PROCESS FOR MELTING AND TREATING ORGANIC SUBSTANCES EMPLOYED IN THE MANUFACTURE OF VARNISHES AND THE LIKE

Wilhelm Krumbhaar, Detroit, Mich., assignor to Beck, Koller & Company, Inc., Detroit, Mich., a corporation of Delaware Application May 5, 1934, Serial No. 724,224

6 Claims. (Cl. 87—13)

The invention relates to the melting, treating or reacting of organic substances employed in the manufacture of varnishes, such as gums, resins and the like, which have a tendency to form foam during the treating operation, and has as its object to provide a process and apparatus which will enable such operations to be carried out in a safer and more efficient manner than heretofore, and so as to produce superior products insofar as uniformity, color and other valuable physical and chemical properties are concerned.

It is well known that there have been considerable difficulties in treating organic substances which foam excessively inasmuch as there is not only the hazard of fire and explosion but also the difficulty of preventing loss of material from the kettle by overflow. In handling relatively small quantities of material, the foam difficulty is controllable but when dealing with commercially sized batches it has been found to be impracticable owing to the considerable amount of space which is required to hold the foam.

Attempts have been made to overcome the foam difficulties and stirrers placed in the body of the liquid and foam beaters placed above the surface of the liquid have been proposed for this purpose. A second difficulty in the processing of such organic substances, particularly in the case of copals, is the danger of local overheating. Steam-jacketed kettles for overcoming the difficulty of overheating and an electrically heated varnish kettle and a varnish kettle heated by a circulating hot oil bath have been proposed.

A third difficulty is the fire hazard. Many of these foaming substances have to be treated at temperatures as high as 675° F. and at such temperatures are liable to flash, even in closed vessels. Inert gases have been introduced into the kettles to reduce the fire hazard. When the material is "pressed out" of the kettle into containers the tendency towards explosion is greatly increased.

I have now found a processing combination and apparatus for melting, treating and reacting such organic substances, which are very efficient in respect to foaming, local overheating and the fire hazard.

According to this invention, the process for melting, treating or reacting organic substances employed in the preparation of varnishes and forming foams upon the application of heat, such as gums, resins and the like, consists in conducting the operation in a kettle, heated from below and also along the sides and top and being provided with an open offtake for the vapors, under such conditions that the surface of the liquid and foam formed thereon are gently and continuously sucked down into the main body whereby the foam becoming warmed, has its surface tension lowered with consequent liberation of the entrapped vapors and disappearance of the foam.

The surface of the liquid and foam formed thereon is sucked into the body of the liquid by mixing with vertical as well as horizontal and radial stirring, the liquid which has been sucked into the main body being thereby passed outwardly, then upwardly to the upper surface and being drawn inwardly again in a continuous flow.

The liquid is preferably withdrawn from the kettle by means of suction with inert gas following the liquid, thereby avoiding an entirely closed kettle and the building up of dangerous pressure.

According to the invention the apparatus for carrying the aforesaid process into effect comprises a kettle of large capacity with a fire box at the lower part, heating means such as steam coils or electrical heating units located around the sides and on top of the kettle, a stirrer mounted for horizontal movement and adapted at the same time to cause a gentle sucking action in the vertical direction on the surface of a liquid and on the foam formed thereon when the kettle is charged and is in operation and then to discharge the liquid outwardly and upwardly in a continuous circulation, an inlet pipe for the introduction of inert gas and an outlet pipe through which the liquid is sucked out from the kettle.

The outlet is positioned in the kettle at a point above the level of the liquid.

My invention will be more readily understood by reference to the accompanying drawing, in which are set forth for the purpose of illustration various embodiments of the inventive thought. In the drawing, Fig. 1 is a vertical sectional view of an apparatus embodying my invention, in which the sides and top of the varnish kettle are heated by means of electrical heating units; and Fig. 2 is a fragmentary view of a similar apparatus in which heating coils are substituted for the electrical units.

According to my invention, there is provided a large kettle (capacity preferably about 1000 gal. or more), in which the heating is accomplished in the usual manner of preparing varnish and resinous substances by a firebox 10, referring to the drawing. This takes care of the main part of the heating of the substance.

Overheating is taken care of not only by the huge size of the batch, the flames not coming in contact with the sides of the kettle at all, but mainly by the following special arrangement: The sides and top of the kettle are entirely surrounded by heating elements which are capable of heating the surfaces uniformly without any local overheating. This may be accomplished by means of electrical heating units 11 (Fig. 1) or by heating coils 12 (Fig. 2), through which steam or some other hot vapor or a hot liquid may be circulated. This is entirely different from the previous types of kettles known to me in that prior kettles were heated entirely by special heating units, whereas in my kettle the principal heating is accomplished by the more economical fire box, the auxiliary heating units being placed on the sides and top only.

The placing of heating units 13 (Fig. 1) or 14 (Fig. 2) on the upper structure of the kettle is a unique feature with very special merit. The heating of the upper structure, especially on the top, is highly desirable inasmuch as it prevents condensation of the vapors and prevents the reflux action of these condensed vapors. In the treating of the copals and in the formation of copal esters, for example, this procedure is in direct contrast to that of the prior art, inasmuch as the condensed vapors were returned to the melting pot so as to prevent loss of glycerine. It has been my experience, however, that the loss of glycerine is more than compensated for by the improved quality of the product obtained using the heaters on the upper structure of the kettle so as to drive off rapidly and to eliminate completely the decomposition products which are undesirable in the finished copal ester.

A very important part of my invention consists of the special stirring device 15 which acts on a principle quite similar to that of a turbine blade. This stirrer is so designed that it sucks foamy liquid down from the top to the lower center of the kettle, and from there it is thrown in a radial direction against the side walls and then thrown upward along the side walls, thus completing a vertical circulation shown by the arrows 16. In addition to the efficient vertical mixing, there is the ordinary horizontal and radial agitation. Due to the vertical mixing secured by this turbine-like blade, the foam is gently drawn down from the top into the main body of the liquid, where it becomes warmed, thus lowering the surface tension of the liquid, liberating the entrapped vapors and the foam disappearing. This action is much more efficient and desirable than a "foambeater" which attempts to break up foam by mechanical beating. It is also much safer because the beating of the foam increases the dispersion of material capable of explosion. For these reasons, any stirrer which insures thorough vertical mixing together with the regular horizontal and radial mixing may be used to advantage in an apparatus of this sort. The present mixer differs from the usual horizontal agitator in that no ordinary horizontal mixer causes the liquid to leave the plane of the agitator, and consequently no vertical mixing results from the use of the ordinary type of agitator except such as is due to simple diffusion; whereas the present agitator or stirrer causes a suction toward the middle of the kettle, thus pulling the upper portion of the liquid down, whereupon the outer portion of the liquid takes the place of the liquid which has been sucked down, thus insuring complete vertical agitation. The ordinary agitator, on the other hand, causes a movement of the liquid only in the plane in which the stirrer turns, and while some radial flow is obtained, the liquid, as soon as it hits the side walls, moves tangentially in the same plane as the stirrer and does not climb up out of the plane along the walls, nor is it forced downwards, except making due allowance for slow diffusion. The slowness of such mixing is made apparent when an attempt is made to mix one colored liquid and one transparent liquid, both having about the viscosity of thin nitrocellulose solution.

A manhole 17 provides for the loading of the kettle with both solid and liquid raw materials. The manhole also is preferably provided with heating units so that there will not be a cold spot trickle center for condensation and reflux action. The manhole cover may have also a very small opening for the introduction of liquid material during the process.

An escape pipe for vapors is designated by the numeral 18 in the drawing. A condenser or fume dispensing system may be provided for the outlet. Naturally, the usual accessories may be provided, such as thermometer wells, safety valves, sampling cocks, sight holes, gauges, pipe fittings for inert gas, vacuum, and the like, these being omitted from the drawing for the sake of simplicity, but it will be understood that their use is contemplated in the complete apparatus.

Another important point is the provision of a pipe 19 for withdrawal of the material by application of vacuum. The advantages of this method of withdrawal of material over that of pressing out by compressed gases have already been mentioned.

The apparatus, just described, is particularly useful, not only in melting and treating copals and in forming esters therefrom, but also in treating at high temperature in large quantities any organic substances or resinous products, especially those which have a tendency to foam and which are susceptible to local overheating and which treatment constitutes a considerable fire hazard.

By organic substances in the following claims I include natural gums and resins, such as copals, Kauri, Congo and the like, synthetic resins, such as phenolic, alkyd urea, vinyl, and the like, oils and other such plastic materials, and the substances so treating them, such as plasticizers, esterifying reagents, and other reactant substances.

What I claim is:

1. In a process for melting and treating foam forming organic materials employed in varnish making in a container, the steps which comprise applying external heat uniformly from all directions to avoid condensation and consequent reflux action of vapors, continually subjecting the materials undergoing treatment to both vertical and radial stirring to avoid excessive foaming, continuously withdrawing vapors from above the level of the materials undergoing treatment, and continuously withdrawing the finished material in liquid form from below the liquid level, under reduced atmospheric pressure, and discharging said material from the vessel at a point above the liquid level.

2. A process for melting and esterifying foam forming acid natural gums which comprises applying heat externally and uniformly to a vessel containing reacting ingredients including the gum to be treated and glycerine, to avoid condensation and consequent reflux action of vapors, continuously subjecting the materials undergoing treatment to both vertical and horizontal stirring to avoid excessive foaming, continuously withdrawing glycerine vapors and decomposition products from above the level of the materials undergoing treatment, and separately withdrawing the finished material under reduced atmospheric pressure.

3. A process for melting and esterifying acid natural gums as set forth in claim 2, wherein the molten material undergoing treatment including such foam as may have formed, is gently drawn downwardly from the top into the main body of the liquid where it becomes warmed, thus lowering the surface tension of the liquid, liberating the entrapped vapors and causing the disappearance of the foam, whereupon the outer portion of the liquid takes the place of the liquid which has been sucked down, and a circulatory movement in a vertical plane is maintained.

4. A process as set forth in claim 2, wherein the finished material is withdrawn in liquid form from below the liquid level and is passed through the main body of the liquid in heat exchange relation thereto, and is discharged from the vessel from a point above the liquid level.

5. A process as set forth in claim 2, wherein the finished material in liquid form is withdrawn from the vessel with an inert gas following the liquid.

6. A process as set forth in claim 2, wherein an inert atmosphere is maintained at all times to avoid danger of explosion.

WILHELM KRUMBHAAR.